United States Patent [19]

Delahanty et al.

[11] Patent Number: 4,921,323
[45] Date of Patent: May 1, 1990

[54] MEMORY POLYMER OPTICAL FIBER SPLICER AND METHODS

[75] Inventors: Francis T. Delahanty, Bensalem Township, Bucks County, Pa.; Vladimir A. Stoy, Princeton; Shiu-Bor Tong, Scarborough, Canada

[73] Assignee: Kingston Technologies, L.P., Dayton, N.J.

[21] Appl. No.: 288,629

[22] Filed: Dec. 22, 1988

[51] Int. Cl.$^5$ ................................................ G02B 6/38
[52] U.S. Cl. ................................ 350/96.21; 350/96.2
[58] Field of Search .................. 350/96.2, 96.21, 96.22; 156/158

[56] References Cited

U.S. PATENT DOCUMENTS 4,178,067 12/1979 Johnson et al. ............... 350/96.21
4,460,820 7/1984 Matsumoto et al. .......... 350/96.21 X

FOREIGN PATENT DOCUMENTS 0190911 11/1983 Japan ................................ 350/96.2
0123813 7/1984 Japan ................................ 350/96.2
2127170 4/1984 United Kingdom ............ 350/96.2

Primary Examiner—William L. Sikes
Assistant Examiner—John Ngo
Attorney, Agent, or Firm—Kenneth P. Glynn

[57] ABSTRACT

The present invention involves an optical fiber splicer made of a unistructural mass of inherent shaped memory polymer material. The splicer has a longitudinal dimension with opposite ends having first bore at one end and a second bore at the other end wherein the bores go into the mass and to each other. Preferably, the first bore and the second bore are merely a single continuous oriface. The unistructural mass has a first shape and a second shape. The first shape is a recoverable, predetermined inherent shape wherein the first bore and second bore each have a preset diameter to accomodate and tightly hold end segments of denuded optical fibers of predetermined diameter in spliced, butted alignment with one another. The second shape is such that the first bore and second bore each have swollen predetermined diameters which are greater than the diameters of the end segments of optical fibers so as to loosely and freely receive the end segments. The unistructural mass of inherent shape memory polymer material is initially formed in the first, inherent shape, and is then swollen and partially shrunk to its second, deformed shape and is capable of being returned to its first shape by application of a non-mechanical stimulus thereto, such as heat. The invention is also directed to preparing the optical splicer as well as to using the optical splicer to obtain a butt-to-butt splicing of optical fibers.

36 Claims, 1 Drawing Sheet

MEMORY POLYMER OPTICAL FIBER SPLICER AND METHODS

BACKGROUND OF THE INVENTION

1. Field of the Invention

The present invention relates to splicing of optical fibers and more specifically to the butt-to-butt splicing of optical fibers by the use of a unique splicer lock which is developed from memory polymers. Thus, the present invention is directed to splicers into which ends of optical fibers may be inserted and subsequently spliced in place in a butt-to-butt manner for permanent fiber optics transmission and to methods of making the splicer as well as methods of using it.

2. Prior Art Statement

Hundreds of patents have issued which are directed to the art of fiber optics splicing and connecting. Most involve very complex mechanical connections and/or the use of optical adhesives or glues. Typical of the patents which show unique methods of splicing are the following:

U.S. Pat. No. 3,944,328 shows the simplistic approach of inline, butt-to-butt splicing of fiber optics utilizing a resinous block with aligned bores with mechanical retention inserts.

U.S. Pat. No. 4,178,067 involves the use of a mass of dimensionally unstable material in cylindrical form which is radially shrunk. After the fiber optics are inserted butt-to-butt, upon causing the unstable matter to expand radially, the presence of the outer sleeve forces the unstable matter to compress and cause co-linear alignment.

U.S. Pat. No. 4,261,644 involves the use of memory metals for mechanically splicing with application of heat.

U.S. Pat. No. 4,435,038 is directed to deformable material involving three integrally formed elongated members that are squeezed together to align optical fibers.

U.S. Pat. No. 4,597,632 is directed to temperature sensitive releasable optical connector which utilizes a shape memory effect metal to align and clamp ferrules.

U.S. Pat. No. 4,647,150 illustrates an arched alignment of optical fibers utilizing an optical adhesive as well as an innertube for butt-to-butt splicing.

U.S. Pat. No. 4,725,117 describes a complex optical fiber connection utilizing a heat-recoverable tube which is constructed of a memory material such as elastic or plastic memory materials, as well as an outer metal contact body. The basic idea of shrinking a memory plastic radially inward to achieve optical fiber alignment is taught in this patent.

U.S. Pat. No. 4,743,084 involves improvement in the use of deformable plastics or the use of shape memory materials as an integral part of a more complex mechanic structure.

U.S. Pat. No. 4,750,803 describes a connector which includes exit port means to allow air to escape during splicing.

In addition to the above, there were suggested many splicing methods using heat-shrinkable polymers (called also memory polymers, heat-recoverable polymers, etc.) to help align optical fibers. These polymers (described e.g. in U.S. Pat. Nos. 2,027,962; 3,086,242; 3,359,193; 3,370,112; 3,597,372 and 3,616,363) are either thermoplasts or post-crosslinked thermoplasts containing a crystalline polymer phase and/or amorphous polymer phase with relatively low glass-transition temperature due to either nature of the polymer or due to plastification effect. Such heat-shrinkable polymer can be forced into one shape and frozen in it; and shrunk by application of heat approximately into the original shape. Because such heat-shrinkable polymers consist of several polymer phases and/or a multitude of separate polymer chains, they do not have a precise shape which could be called "inherent" and they can return only approximately into a predetermined shape. In addition to that, the highly crystalline polymers must be heated above the melting point of their crystalline phase; the re-crystallization of the polymer causes significant volume contraction which is detrimental to the alignment. Because of that the heat-shrinkable component in itself cannot form a splicer with a low insertion loss. Such splicers require a combination of highly symmetric tubular shape, coupling gels or adhesives and elaborate support structures, which in turn cause a high cost of the device and of its installation. Typical of the patents which show the unique methods of splicing are the following: Great Britain Patent No. 1,588 227 describes a splicing method using heat-shrinkable crystalline thermoplastic sleeve to achieve fiber connection.

Notwithstanding the above prior art references, it should be noted that the present invention has not been anticipated or rendered obvious because the use of a unistructural memory polymer is neither disclosed nor suggested as a complete and simple but advanced structure in and of itself. Further, the unique steps of preparing the memory polymer utilized in the present invention splicer is also lacking in the prior art.

SUMMARY OF THE INVENTION

The present invention involves an optical fiber splice which is made of a unistructural mass of inherent shape memory polymer material. The unistructural mass has a longitudinal dimension with opposite ends which includes a first bore at one end and a second bore at the other end wherein the bores go into the mass and to each other. In a preferred embodiment, the first bore and the second bore are merely a single continuous oriface. The unistructural mass has a first shape and a second shape and the first shape is a unique, recoverable, predetermined inherent shape wherein the first bore and second bore each have a preset diameter to accommodate and tightly hold end segments of denuded optical fibers of predetermined diameter in spliced, butted alignment with one another. The second shape is a deformed shape caused by solvent swelling and partial shrinking of the inherent memory polymer material such that the first bore and second bore each have swollen predetermined diameters which are greater than the diameters of the end segments of the denuded optical fibers so as to loosely and freely receive the end segments of the denuded optical fibers. Thus, the unistructural mass of inherent shape memory polymer material is initially formed in the first shape, also known as the inherent shape, and is then swollen and partially shrunk to its second or deformed shape and is capable of being returned to its first shape by application of a non-mechanical stimulus thereto, such as heat. The invention is also directed to the method of preparing the optical splicer as well as the method of using the optical splicer to obtain a butt-to-butt splicing of end segments of optical fibers.

BRIEF DESCRIPTION OF THE DRAWINGS

The objectives and advantages of the present invention will become more apparent and will be more fully understood from the following detailed description taken in conjunction with the accompanying drawings wherein.

DETAILED DESCRIPTION OF THE PRESENT INVENTION

Figure 1:
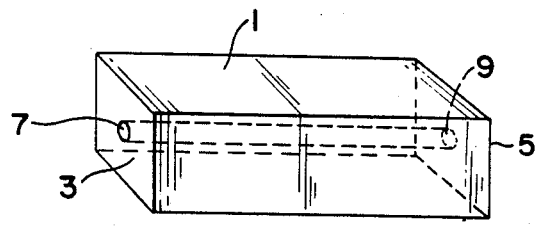
FIG. 1 shows an oblique frontal view of an optical fiber splicer of the present invention.

The butt-to-butt splicing of optical fibers requires high alignment precision. The faces must be flat and perpendicular to optimize light transmission and there must be high mechanical integrity for fiber fixation. The outer diameter or cladding diameter of the majority of currently used glass optical fibers is standardized at 125 microns while their light guiding core range is between 4 microns for single mode fibers up to about 50 to 100 microns for multi-mode fibers. Thus, any misalignment of the spliced optical fibers, any defect at the faces of the fibers or on the surfaces or any gap between the fiber ends will contribute to the loss of the transmitted light and to a resulting loss of transmitted information. This transmission loss, referred to as "insertion loss" reduces the signal-to-noise level, and is expressed in decibels (dB). It is an object of all splicing techniques to minimize insertion losses.

The application of various splicing techniques such as those which are described in conjunction with the prior art patents set forth above under field conditions is very difficult and requires highly skilled and expensive personnel as well as splicing products which are fairly expensive. Thus, the splice as used for multi-mode applications may exhibit poor performance notwithstanding the effort put into reducing insertion losses. Further, the use of multi-mode applications in single mode fiber optic splicing also results in increased insertion losses. For example, a very common splicing technique involves fusing the two ends of the butt-to-butt optical fibers under a special stereomicroscope. This procedure provides low loss connections but due to the considerable set up time requires a substantial amount of expenditure and is extremely inconvenient for field applications. More portable or in-place splicing equipment seems to yield increased insertion losses based on their relative economics. In other words, the less expensive the technique, the more likely significant insertion losses will occur.

It is an objective of the present invention to achieve a splicer which would provide low cost, mass produced unistructural products which would be fast and convenient under field conditions and which would be suitable for use by personnel who do not require special technical skills or the use of special high performance equipment. Further, the present invention splicer achieves low loss performance without using index-matching gels or adhesives.

As indicated, the major problem with splicing and connecting optical fibers in a butt-to-butt arrangement involves misalignment. However, the inherent memory polymer materials utilized in the present invention eliminate the problem due to accurate mutual positioning of the optical fibers.

Inherent memory polymers are amorphous with moderate crosslinking density. They are substantially deformable above their softening temperature and have only one "inherent shape" in which all of the polymer segments are in their most probable conformation. The crosslinking density is such that each continuous piece of the inherent memory polymer is formed substantially (i.e. with exclusions of impurities such as residual solvents, monomers, oligomers, etc.) by one single giant macromolecule. Furthermore, each such macromolecule has substantially a uniform network density and substantially a single amorphous polymer phase. We refer to such structure as a "unistructural mass" to distinguish it from heat-shrinkable, shape-recovering or memory polymers having more than one polymer molecule and/or more than one polymer phase which lack the inherent shape memory. As it is obvious from review of the prior art, the typical heat-shrinkable polymer hitherto used for splicing are highly crystalline polymers, such as polyethylene, copolymers of ethylene-vinylacetate and the like. These polymers consist of two polymer phases of substantially different properties. For instance, polyethylene used in most of the applications has a crystalline phase with a melting point between about +105° to +130° C., and an amorphous phase with a glass-transition temperature between about −100° C. and −70° C. The amorphous crosslinked polymers used in the splicers according to our invention have an additional advantage in their high optical clarity. Because our splicers are typically clear, uniform plastic articles, the loss in transmitted light is immediately detectable by the light emitted at the fiber ends contact. This can be used, given proper instrumentation, for measuring the insertion loss directly and in a manner very suitable for field installations. The shape of such a polymer can be changed above its softening temperature into a deformed shape by the action of external forces but once the external forces are removed the internal forces of the polymer cause it to return to its inherent shape. The deformation of the inherent memory polymer is fully reversable and this allows complete recovery to its inherent shape. The return from deformed to inherent shape can be deferred by decreasing temperature on the deformed unistructural mass below its softening temperature. Its return to inherent shape can be then induced by some external stimuli such as an application of heat or other energy.

In general, the optical fiber splicer of the present invention is made from a mixture of monomers so as to create a unistructural mass which has a longitudinal dimension with opposite ends which includes a first bore at one end and a second bore at the other end and these bores enter the mass towards and in alignment with one another and, in fact, connect or intercept one another. It should be noted that the unistructural mass is defined as having two bores, although, preferably, it is a single continuous opening from one end of the unistructural mass to the other and might be characterized as a single bore. Thus, the two bores of the present invention are equivalent to and, by definition, in many instances are defined as a single bore which passes completely through the unistructural mass.

A typical memory splice made from the inherent memory polymer material in the present invention may have a continuous lumen which is cylindrical and which has a diameter which is equivalent to or slightly less than the other diameter of a bare optical fiber to be connected with another bare optical fiber. Prior to insertion of the fibers, the bores or lumen is deformed so that its inside diameter becomes larger than the outside diameter of the fibers to be spliced and the unistructural mass is "frozen" in this deformed state. As long as the memory polymers are frozen in their deformed state by exposure to temperatures below their glass tramsmission temperatures, e.g. by solvent swelling and partial shrinking, they will remain frozen until the application of adequate heat to raise the temperature of the unistructural mass above the glass transmission temperature, at which time the unistructural mass will return to its inherent shape. Therefore, the optical splicer of the present invention receives denuded segment ends of optical fibers which are easily inserted into the enlarged bores. Thereafter, the unistructural mass is exposed to a stimulus such as heat which causes the recovery of the inherent shape and the inherent aligning and tightening of the butt-to-butt optical fiber end segments. The splicer cools down to ambient temperature and forms a rigid glassy polymer which permanently holds the fiber ends safely, firmly and properly aligned.

In order to achieve a well defined inherent shape the polymer or mixture of polymers utilized has to have at least a minimum cross linking density. The shape of such polymer can be changed into a deformed shape by the action of external forces and can be returned to the inherent shape by the action of other external forces. It has been noted in general that the deformability of any polymer with inherent memory decreases with its cross linking density. To achieve a sufficient reversal of deformability the polymer should, in preferred embodiment, have maximum cross linking density. Thus, the inherent memory polymer materials used in the present invention have at least a minimum cross linking density and, ideally, have a maximum cross linking density.

Non-crystalline (i.e. amorphous) polymers have two types of behavior in two temperature ranges. The transition temperature between the two ranges is called Glass-Transition Temperature ($T_g$). If temperature is lower than $T_g$, the polymer is in glassy state in which its deformability is very low and modulus of elasticity is high. If temperature is higher than $T_g$, then modulus of elasticity is low and deformability is high. The polymer in this temperature range has viscoelastic or rubbery behaviour, depending on crosslinking density and temperature.

The softening temperature $T_s$ is used in further description instead of $T_g$ and $T_m$ because it is readily measurable, e.g. by ASTM D569-48 or by a similar method, and because it is more closely related to the polymer performance with respect to the present invention.

Memory polymers useful in the present invention are those with $T_s$ higher than ambient temperature, and preferably higher than about 50° C. The upper limit of $T_s$ is restricted only by temperature resistance of the memory polymer, optical fiber or other system components and means of the connector heating during installation. Therefore, there is no inherent upper limit on $T_s$, but above practical consideration set the practical upper limit on $T_s$ to be about 200° C., and preferably about 150° C.

Most of non-crosslinked polymers are soluble in one or more solvents. Such solvents are different for various polymers and referred to as "thermo-dynamically good solvents" (TGS). Solvent-polymer interactions are characterized in various ways, e.g. by Chi parameter in Flory-Huggins eqution. TGS have Chi<0.5 for a given polymer. (In other words, if Chi<0.5 for a given polymer-solvent pair, the non-crosslinked polymer is soluble in this solvent.)

Covalently crosslinked polymers cannot be dissolved without destruction of the network. Instead, they swell to certain equilibrium in the solvents with Chi<0.5 and become rubbery in the process. The swelling extent can be expressed in various ways, for instance as volume fraction of polymer $v_2$ or solvent content $B_s$ in weight %. The swelling extent depends both on value of Chi and on crosslinking density. Because Chi value does not change with crosslinking appreciably and can be established independently of swelling (e.g. measured on linear model polymers), the swelling of crosslinked polymers in TGSs can be used as characteristic of crosslinking density.

Memory polymers useful in the present invention have minimum crosslinking density corresponding to $v_2=0.05$, and preferably $v_2=0.1$ in the TGS with Chi=0.3-0.4. The maximum cross linking density corresponds to $v_2=0.5$, and preferably to $v_2=0.667$ for the same TGS.

Swelling of the memory polymer has several effects important to the present invention:
1. Swelling in TGS to equilibrium decreases $T_s$ below ambient temperature so that swollen memory polymers are rubbery and readily deformable.
2. Swelling increases isotropically every inherent dimension of the memory polymer. In the swollen state $$LD_s = LD_i * (1/v_2)^{\frac{1}{3}} \quad (1)$$

where $LD_s$ and $LD_i$ are the swollen linear dimension in undeformed state and inherent linear dimension, respectively.

As long as the covalent network is isotropic, the above relation governs all linear dimensions, such as length, outside diameter, inside diameter of a cavity in the memory polymer, etc.

The polymers satisfying the essential requirements can have various chemical composition. Such inherent memory polymers can be crosslinked acrylates and methacrylates; N-substituted acryl and methacrylamides; crosslinked vinyl polymers, such as polystyrene, polyvinylpyrridine, polyvinylchloride, resins and the like. In other words, because the requirements are of physical nature, the function of the invention is independent of the specific composition of the memory polymer as long as the essential physical requirements are met.

Some specific memory polymer compositions are described in Examples set forth below.

The present invention consists in using inherent shape memory polymers of above described characteristics in conjunction with certain design of the connector of optical fiber and certain connecting or installation procedure. The designs and procedures described below assume that the optical fiber has circular crossection with coaxial core and jacket, because all current optical fibers are of such kind. It is not intended, however, to limit the invention to connecting the current optical fibers only. Should another type of fiber come to use later (e.g. with rectangular, triangular, octagonal or eliptical crossection or with asymetric core) the splicer and connecting methods can be readily adapted to such new fiber as long as its shape is precisely defined.

The method of connector manufacturing and optical fiber connecting according to the present invention has several essential steps:

1. The article of inherent shape memory polymer is created which has bores which define one or more internal cavities of circular crossection in positions corresponding to intended positions of the optical fibers to be connected (for instance, a single cylindrical cavity for end-to-end connection or splicing). The inherent inner cavity diameter IDI is the same or smaller than the outside diameter of the optical fiber ODF (currently 125 microns for glass fibers). The cavity can be created in a number of ways, such as drilling or burning the memory polymer with laser beam and similarly. Particularly preferred method is to create the memory polymer around a Mandrel A of circular crossection and outside diameter ODMA. Mandrel A can have different dimension than the optical fiber if some conditions are met (defined below), but it is important that the shape of crossection of the Mandrel A of the optical fiber are the same and that the ratio ODMA/ODF has a certain preset value. This mandrel can be preferably the optical fiber itself, in which case ODMA=ODF and the conditions for Mandrel A are met automatically. The memory polymer unistructural mass can be created around such mandrel in a variety of ways. For instance, it can be created by polymeration of suitable mixture of monomers, including the crosslinking comonomer, in a mold with the mandrel inserted. Alternatively, it can be created by embedding the mandrel into a non-crosslinked polymer precursor of the memory polymer, and by post-crosslinking the composition by some known method depending on the chemistry of the memory polymer used (e.g. irradiation, heat, etc.).

Once the memory polymer is formed with the desired crosslinking density, the mandrel is removed. The removal can be carried out in various ways depending on the mandrel properties. For instance, the mandrel can be pulled out provided that it has appropriate deformability (e.g., Nylon 6), or can be melted, dissolved or etched away. The preferred process is to swell the memory polymer in a suitable solvent and pull the mandrel out from the enlarged cavity. After the polymerization and/or crosslinking process is finished, memory polymer can contain, in addition to the three-dimensional polymer network, an inert component, such as unreacted monomers or a diluent from the original mixture. If the volume fraction of such diluent is $v_d$, then the inherent inner diameter of the cavity will be $$IDI = ODMA*(1-v_d)^{\frac{1}{3}}. \quad (2)$$

2. The cavity is enlarged and a new mandrel is inserted which has outer diameter larger than ODF. This mandrel B can have crossection rather different from that of the optical fiber, but the optical fiber has to be readily insertable into the cavity of the size and shape of the Mandrel B. Any linear dimension of such cross-section has to be larger than ODF. If the Mandrel B has circular cross-section, its diameter is designated ODMB. The ratio ODMB/ODF will determine ease of optical fiber connection later. In any case, it is necessary that ODMB/ODF>1, and preferably >1.1.

On the other hand, it is preferred that ODMB/ODF<2, because in opposite case two optical fibers could fit accidentally into a cavity designed for a single optical fiber. The preferred method of the cavity enlargement is the swelling of the inherent shape memory polymer. As a rule, for any polymer there are a number of good solvents which will swell the memory polymer so that the Mandrel B is comfortably inserted into the cavity. The necessary swelling can be readily calculated from equations (1) and (2) or determined by experiment.

Mandrel B can be made of miscellaneous materials, such as polymers, metals or glass. From the viewpoint of the latter, for removal of Mandrel B, the partly extensible polymers are preferred (e.g. polyamides, polyurethanes or polyolefins).

3. The inherent shape memory polymer is shrunk around the Mandrel B by removal of the solvent in which the memory polymer was swollen during the Mandrel B insertion. The solvent removal can be done by solvent extraction or evaporation.

After the solvent removal is finished, the inner cavity diameter is ODMB and the residual volume fraction of solvent in the polymer is $v_s$. The $v_s$ has to be such that (a) $T_g$ of the memory polymer is higher ambient temperature, and preferably higher than 50° C.;
   (b)

$$v_s < 1 - (1-v_d)*(ODMA/ODF)^3 \quad (3)$$

The residual solvent can be left in the memory polymer intentionally for various reasons, e.g., to decrease $T_g$ or other properties. If so, it is preferred to use in the previous step mixture of volatile and non-volatile solvent in such a proportion that the latter remains in concentration $v_s$ after the volatile solvent is evaporated completely.

4. Mandrel B is removed from the cavity. This removal can be carried out in various ways, such as etching the mandrel away by an agent which does not attack the memory polymer; dissolve the mandrel in a solvent which does not swell the memory polymer or does not decrease its $T_g$ below ambient temperature, or similarly. The preferred way is pulling Mandrel B made from a partly extensible polymer, out of the cavity.

After this operation the splicer is ready for installation of the optical fiber. The Mandrel B removal can be carried out as a part of manufacturing process (i.e. prior to packaging the splicer) or just prior to the splice installation. The advantage of the latter method is increased resistance of the splicer to an accidental temperature increase during storage or shipment, particularly if the inherent shape memory polymer mass has splicer to an accidental temperature increase during storage or shipment, particularly if the inherent shape memory polymer mass has relatively low $T_s$ for convenient installation. The splicing method is very simple due to the autoaligning characteristics of the inherent shape memory polymer unistructural mass accordto the invention.

The installation procedure consists of few essential steps:

1. Optical fibers are denuded in proper lengths (i.e., plastic buffer is removed) and ends of fibers are prepared by the customary way (cleaving, polishing, etc.). This preparatory step is identical with other connecting and splicing methods.
2. Denuded and prepared ends of optical fibers are inserted into the cavities of the inherent shape memory polymer splicer. This step is very easy because the cavities have ID=ODMB which is larger than the received optical fiber OD and no aligning or accurate positioning of the fibers is necessary.
3. While fibers are held in place, the splicer is heated above $T_s$ for a time sufficient release of the internal stresses and consequent contraction of the cavity to its final size and configuration, i.e. such that it goes from its deformed shape back to its inherent shape. The rate of such return can be very slow if the temperature is around glass transition temperature $T_g$ of the polymer. For this reason the polymer has to be heated to a temperature sufficiently above $T_s$ but sufficiently below the temperature at which the components could be damaged. The cavity contracts around the fibers, as it tends to shrink to the diameter $$IDC = ODMA*[(1-v_d)/1-v_s)]^{166} \quad (4)$$

The cavity containing the optical fibers cannot shrink to a smaller diameter than ODF, and holds the fibers by the force proportional to (ODF-IDC) difference.

The cavity contraction thus generates pressure forcing the fibers into the intended position. The heating method is not particularly critical. The splicer may be heated by hot air, steam, electrically generated heat, etc.

4. The connector is cooled down to a ambient temperature and secured by a suitable support or protective system, if necessary.

Referring now to the drawings there is shown in FIG. 1 Optical Splicer 1 which is basically a mass of inherent memory polymer material which has been formed with a bore 7 and a bore 9 at opposite ends 3 and 5 of its elongated dimension. As can be seen, bores 7 and 9 are, in fact, a single bore of a single diameter in total alignment in a straight line.

Figure 2:
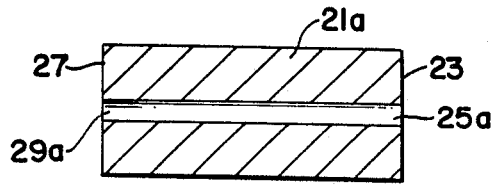
FIG. 2 shows a cut sideview of an optical splicer of the present invention having bores with the unistructural mass in its inherent shape.
Figure 3:
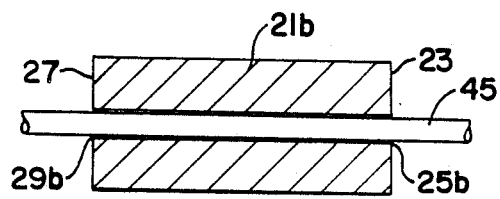
FIG. 3 shows the side cut view of the optical fiber splicer of FIG. 2 which has been swollen and has a mandrel inserted therein.
Figure 4:
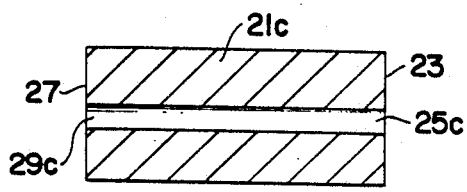
FIG. 4 shows a side cut view of the optical fiber splicer of FIG. 2 after it has been swollen and partially shrunk.

FIGS. 2 through 6 show cut sideviews of an inherent shape memory polymer material through its various stages of preparation and use. Thus, in FIG. 2, there is shown unistructural mass 21a which has longitudinal dimension ends 23 with bores 25a and 29a as shown. In FIG. 2, bores 25a and 29a have been formed to create a single cylindrical tunnel or lumen through mass 21a and, as in FIG. 1, in fact, all form a single, continuous opening. The diameter of bores 25a and 29a are the same and are greater than the diameters of denuded fiber optic ends to be spliced as discussed in conjunction with FIG. 5 below. The bores 25a and 29a may be formed by drilling, by other techniques which are discussed above, or by actually forming the unistructural inherent shape polymer material mass around a mandrel of equal or slightly smaller size than the size of the optical fibers to be spliced. Next, the unistructural mass 21a is swollen with solvent and, as shown in FIG. 3, the expanded mass, that is unistructural mass 21b has a mandrel 45 inserted into it through bores 25b and 29b which are of greater diameter than bores 25a 29a due to the swelling. Additionally, mandrel 45 is of greater diameter than the diameters of the end segments of the optical fibers to be spliced. Unistructural mass 21b is subsequently shrunk partially and mandrel 45 is removed so as to create the unistructural mass 21c shown in FIG. 4. This unistructural mass 21c, with longitudinal ends 23 and 27 now have bores 25c and 29c. These bores are partially shrunk in diameter but are still of greater diameter than the end segments of the optical fibers to be spliced.

Figure 5:
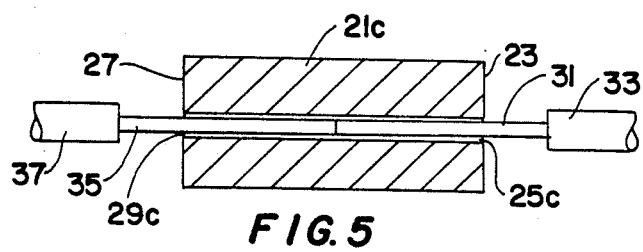
FIG. 5 shows a cut sideview of the optical fiber splicer of FIG. 2 wherein denuded end segments of two optical fibers have been inserted into the bores.
Figure 6:
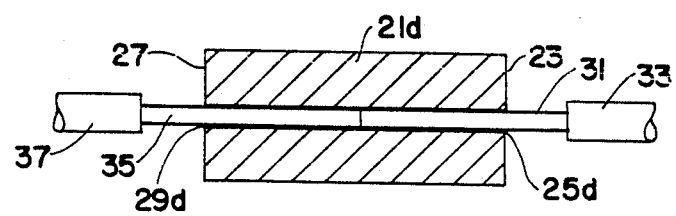
FIG. 6 shows the optical fiber splicer of FIG. 2, after the unistructural mass has been heated so as to return to its inherent shape, thereby aligning and holding the end segments of the optical fibers; and, FIG. 7 shows a side cut view of an alternative optical fiber splicer of the present invention adapted to receive different size optical fibers.

FIG. 5 shows unistructural mass 21c with ends 23 and 27 and bores 25c and 29c respectively. Here, optical fibers 33 and 37 have denuded end segments 31 and 35. The end segments 31 and 35 are of less diameter than bores 25c and 29c and are readily and freely inserted therein and contacted in a butt-to-butt arrangement. Although not essential, various preparations for the tips or very ends of end segments 31 and 35 may be utilized prior to insertion and these techniques, such as cleaving are well-known in the art. In any event, once optical fiber end segments 31 and 35 have been inserted as shown in FIG. 5, unistructural mass 21c is returned to its original inherent shape shown in FIG. 2 by virtue of application of an external stimulus such as heat. This is shown in FIG. 6, after heat has been applied, and, as can be seen, end segments 31 and 35 are forced into excellent alignment and are held rigidly in place with a permanent splice using the single unistructural mass without any mechanical parts, without any adaptors or screws or any other of the devices which could create difficulties and/or minimize the useful life of the splice.

Figure 7:
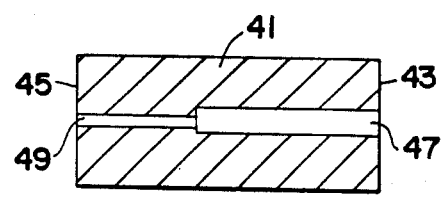

FIG. 7 shows a variation wherein unistructural mass 41 made of inherent shaped memory polymer material has a longitudinal dimension with ends 43 and 45 opposite one another and bores 49 and 47 as shown. In this case, bore 49 has a smaller crossection than bore 47. Thus, bore 47 might be designed to accommodate a larger optical fiber or even one which has not been denuded.

EXAMPLE 1

All the percents in this and the following Examples are meant as per cent by weight unless stated otherwise. Fifteen (15) cm long flint glass tube of I.D. 6 mm was closed by tightly fitting polyethylene caps on each end. In the center of each cap, a small hole was punched to allow insertion of optical fiber. Denuded and cleaned optical fiber (O.D. 125 microns, core diameter 50 microns) was inserted through the hole of one of the caps which was then fitted on the bottom end of the tube and sealed with an epoxy resin. Then two additional holes were punched into the other cap to allow for filling by a syringe, and the cap was installed on the top of the tube so that the optical fiber was protruding through its central hole. The mold thus formed was then filled by the monomer mixture consisting of 98.75% of isopropylmethacrylate, 1.20% of tetraethyleneglycol methacrylate and 0.05% of dibenzoyl peroxide. The filled mold was then fixed into a rack assuring that the optical fiber going through the mold is tight and straight. The mold and rack were then put into a container filled with nitrogen, sealed and heated to 70° C. in oven for 14 hours. Afterwards, the mold was removed from rack and the glass tube was broken carefully to extract the rod-shaped piece of the clear, rigid polymer with optical fiber embedded approximately in the rod axis. The polymer rod was then swelled in methyl alcohol overnight so that it expanded somewhat and became rubbery. The glass fiber was readily removed at this point. The rod was cut by a razor to 10 mm sections which were then swelled gradually in methylisobutylketon. After the complete swelling the internal cavity diameter was approximately 200 microns so that readily accepted insertion of Nylon 6 fiber of diameter about 150 microns. With the Nylon mandrel in place, the splicers were deswelled in methanol and then dried first at 105° C. for about 12 hours and cooled to ambient temperature. After this time the polymer became again clear and rigid, and the Nylon fiber was readily extracted by moderate pull. The resulting splicer had a cavity of about 150 microns approximately in the center. The polymer had $T_g=81.3°$ C. as determined by thermomechanical measurement. The splicers were used splicing the optical fiber of the same specifications as the one used as mandrel A. Fiber ends were prepared by denuding in the customary was and cleaved with a commercial cleaver. Then the fiber ends were inserted into the splicer bore until they met, and while held in place, the splicer was heated with a commercial heat-gun for several seconds and then left to cool to ambient temperature (total time of heating and cooling was about 1 minute). Then the insertion loss of the spliced fibers was measured on an optical bench using 5 mW HeNe laser as a source and silicone planar diffused PIN photodiode as a detector. The loss was calculated from comparison between the spliced fiber and the original continuous fiber of the same length. It was found that the spliced fibers had a consistently lower insertion loss than 0.5 deciBell (dB).

EXAMPLE 2

The same molds as in example were filled with a monomer mixture consisting of: 76.85% of isopropylmethacrylate, 20% of n-Butylmethacrylate, 3.1% of ethyleneglycol dimethacrylate and 0.05% of dibenzolylperoxide. The mixture was polymerized under the conditions described in Example 1. After the swelling the polymer in methanol and extracting the optical fiber, the swollen rod was cut by razor in parallel cuts under angle about 45° and dried in oven until rigid. Then the angled faces were ground and polished to be uniformly smooth, and the splicers were reswollen in methanol. The rest of the process was identical with Example 1. The splicers had $T_g$ about 70° C. and their angled, polished faces facilitated insertion of the optical fibers considerably, even though some splicers had off-centered bores. The spliced fibers (using dry fibers without any coupling agents) had the following performance:

Average insertion loss: 0.28 dB
Standard deviation: 0.14 dB
Average experimental error: 0.03 dB.

The splicing procedure including fiber preparation took less than 5 minutes. This example shows that the splicers from the unistructural mass according to our invention can in themselves provide low loss splicing in spite of assymetric shape and without using various auxilliary means (coupling gels, index-matching adhesives, mechanical supports, etc.) the other splicers need for a comparable performance.

EXAMPLE 3

Aluminum mold was prepared in the following way: two rectangular holes (about 90×20 mm) were cut into a rectangular aluminum plate 100×50 mm large and about 5 mm thick so that about 2 mm wide strip was left between both apertures. Short lengths (about 50 mm) of denuded optical fiber (O.D. 125 microns) were then laid across the width of the plate and glued to it by epoxide glue on each end. Since the fibers were relatively short and supported in the middle by the 2 mm aluminum strip, no external mechanism was needed to straighten them or stretch them. This part was then put into a flat-bottomed aluminum weighting boat and filled with the same monomer mixture as in Example 2. The volume of the monomer mixture was selected so that the fibers were approximately in the middle of the layer. Then the mold was flushed with nitrogen and covered by an aluminum weighting boat of the same size which floated freely on the monomer. The mold was put into nitrogen-filled container and polymerized as in previous examples. After the polymerization was finished, both boats were stripped from the frame plus polymer, and the polymer was let to swell in methanol. The swollen polymer was then taken from the frame, the sections of the fiber were pulled out and the strips of polymer were cut in parallel fashion so that the bores left behind by the optical fibers were roughly in the middle between and parallel to the cuts. The sections were then cut again by razor to a shape approximating a trapezoid, and dried. The dry pieces were then ground and polished into the shape of a trapezoid having a larger rectangular face about 10×4 mm opposite smaller rectangular face about 2×2 mm height about 4 mm. The bore axis was about 2 mm above the largest face and length about 6 mm. The splicer precursors were reswollen in methanol, and then swelled consecutively in ethanol, isopropanol and acetone (in the order of increasing swelling). Once the maximum swelling in acetone was achieved, the bore had a diameter over 200 microns and accepted readily Nylon mandrel of diameter about 175 microns. The polymer over the mandrel was then carefully deswelled using above swelling solvents in opposite order, and dried as in the previous examples. The clear, homogeneous splicers of the trapezoidal shape were stored with the Nylon mandrel inside to protect the bore from contamination. The mandrel was readily pulled out immediately prior splicing. The splicers were more convenient to use than the rod-shaped splicers described in the previous Examples; and in spite of utter lack of symmetry, they had a similar low insertion loss without using coupling agents or auxilliary support structures. The above examples specificly illustrate some of the preferred embodiments of the splicer of the present invention, including its preparation and its use. Obviously, variations may be made by the artisan without exceeding the scope of the present invention. The following examples illustrate testing and polymer variations, as follows:

EXAMPLES 4 AND 5

The procedure to analyze the performance of the splicer was to measure the optical loss suffered by a continuous fiber after the fiber has been cut in half and then reconnected by the splicer. The experimental set-up consisted of a source, mechanical apparatus to hold the fiber and align it with the source, and a power meter to measure the amount of light propagated through the fiber.

The source used was a 5 mW HeNe laser chosen for its ease of beam manipulation and excellent amplitude stability. The output of the HeNe laser was first steered through a light baffle to insure that diffuse scattering of the beam from some of the optical components used (primarily the input coupler) would not be reinjected into the laser cavity. Retroreflected components of the laser beam can cause rapid fluctuations in the laser intensity due to power drop outs caused by modal competition between the internal cavity modes and modes external to the cavity (scattered components). A 0.5 neutral density filter (32% transmission) was used as the primary element in the baffle. The output of the baffle was steered into the fiber optic coupler. The coupler focused the beam into the input end of the fiber which was held by the coupler. The fiber now served as the sole propagation link of the system. The output end of the fiber was held by the output collimator which served to mechanically hold the fiber and collimate the light emerging from it to illuminate an optical detector. The optical detector consisted of a silicon planar diffused PIN photodiode whose output was fed into a digital power meter for visual display.

The procedure for measuring the performance with this equipment was as follows:
1. Approximately one meter length of optical fiber was prepared by removing (buffer swollen in dichloromethane) about 150 mm of buffer from each end of the fiber and the ends cleaved to produce clean, perpendicular faces. The exposed length of each end (buffer removed) was on the order of 100 mm.
2. The fiber ends were then cleaned by wiping with isopropyl alcohol and then inserted into chucks, which held the fiber. One chuck was mounted to the input coupler and the other to the output collimator.
3. The input coupler was then adjusted to achieve the maximum power through the fiber (1.5–1.8 mW). This power was then recorded ($I_o$).
4. The fiber was then cut in the middle and the cut ends prepared as in (1) except only 50 mm of buffer was initially removed and the exposed lengths were less than 10 mm.
5. The cut ends were then inserted into a splicer which was heated to effect the memory action.
6. After the splice was heated by a commercial heat gun and allowed to cool (total time approximately 60 seconds), the resultant power through the fiber was the recorded (I).
7. Loss was calculated in dB:

$$dB\ loss = -10 \log \frac{I}{I_o}$$

Insertion losses measured on candidate splices averaged 0.28 dB as discussed in conjunction with Example 2 above. It is believed that the splice performance can be further improved to the point of an average loss of 0.2 dB with a much narrower standard deviation. The performance achieved compares quite favorably with the performance of other multimode splices. Thus, the performance work of 0.2 dB insertion loss may be achieved with the present invention in the field whereas this is usually not achieved with the prior art techniques. The only mechanical splice reported to have similar performance without a coupling cement or gel is the GTE elastomeric splice which is very expensive due to the amount of precision molding necessary to produce the splice. This splice makes use of a compliant material in which a precision cavity is molded or machined. The material deforms to allow insertion of the fibers and then relies on elastic forces to align and fix the fibers. Performance data from Example 2 is shown in Table 1:

TABLE 1

| PERFORMANCE DATA | |
| --- | --- |
| SAMPLE SIZE: | N = 7 |
| AVERAGE INSERTION LOSS TARGET: | Less than 1.0 dB |
| *MEASURED AVERAGE INSERTION LOSS: | 0.28 dB |
| AVERAGE EXPERIMENTAL ERROR: | 0.03 dB |
| STANDARD DEVIATION: | 0.14 dB |
| NOMINAL RECOVERY TIME OF SPLICE TO ALIGN AND SECURE CLEAVED FIBERS: | 30 seconds |
| AVERAGE $T_g$ (glass transition temperature): | 81.3° C. |

*All losses measured on optical fiber with 50 micron core diameter and total cladding diameter of 125 micron. Multimode silica glass fibers were tested using a 633 nm source.

EXAMPLES 6-12 POLYMER COMPOSITION MIX AND SOLVENTS

Table 2 shows various glass transition temperatures calculated ($T_g$) for formulations 6-0 through 12-0 and Table 3 illustrates the activity of various solvents on crosslinked IPMA with 1% TEGDMA. These merely illustrate the types of variations which may occur regarding $T_g$ based on changing polymer component percentages and based on solvent variations. Table 4 shows swelling changes for solvent and component mix changes simultaneously.

The time taken to make a splice, as outlined in a previous section, is dominated by the time it takes to sufficiently swell the buffer in dichloromethane in order to remove it from the fiber. In actual field applications, this procedure can be easily shortened by using commercially available mechanical strippers

TABLE 2

| COMPOSITION OF MEMORY POLYMER FOR FIBER OPTIC SPLICE | | | | | |
| --- | --- | --- | --- | --- | --- |
| Formulation No. | Isopropyl Methacrylate Wt. % | n-Butyl Methacrylate Wt. % | Tetraethyleneglycolmethacrylate Wt. % | $T_g$ Calculated | $T_g$ Measured |
| 6 - 0 | 98.8 | 0 | 1.20 | 81.2 | 81.3 |
| 7 - 0 | 88.6 | 10.2 | 1.20 | 75.1 | — |
| 8 - 0 | 87.9 | 10.0 | 2.10 | 75.4 | — |

TABLE 2-continued

COMPOSITION OF MEMORY POLYMER FOR FIBER OPTIC SPLICE

| Formulation No. | Isopropyl Methacrylate Wt. % | n-Butyl Methacrylate Wt. % | Tetraethyleneglycolmethacrylate Wt. % | Tg Calculated | Tg Measured |
|---|---|---|---|---|---|
| 9 - 0 | 78.7 | 20.3 | 1.0 | 69.0 | — |
| 10 - 0 | 97.0 | 0 | 3.0 | 81.6 | — |
| 11 - 0 | 86.9 | 10.0 | 3.1 | 75.6 | — |
| 12 - 0 | 76.9 | 20.0 | 3.1 | 69.6 | — |

TABLE 3

SWELLING OF CROSSLINKED ISPROPYL METHACRYLATE (1% OF TEGDMA) IN SELECTED SOLVENTS

| SOLVENT | $L/L_o$ | Bs, % Wt. | REMARK |
|---|---|---|---|
| Methanol | 1.21 (Calc. 1.24) | 39.3 | Flexible |
| Ethanol | 1.33 | 61.2 | Flexible |
| Isopropanol | 1.42 | 70.7 | Flexible |
| Acetone | 1.63 | 75.2 | Cracks |
| MeIBK | 1.62 (Calc. 1.60) | 77.5 | Flexible |
| Cyclohexane | 1.67 | 79.1 | Some Cracks |
| Morpholine | 1.45 | 69.2 | Cracks |
| Tetrachloroethylene | 1.84 | 89.5 | Very Brittle |
| 2-Me Pyrrolidone | 1.53 | 76.5 | Cracks |
| -Butyrolaceton | 1.25 | 55.6 | Soft |
| DMSO | 1.03 | 18.8 | Rigid |

TABLE 4

LINEAR SWELLING OF MEMORY POLYMER COMPOSITIONS IN VARIOUS SOLVENTS ($L/L_o$) COMPILED FROM TABLE 1:

| Solvent | 6-0 | 7-0 | 8-0 | 9-0 | 10-0 | 11-0 | 12-0 |
|---|---|---|---|---|---|---|---|
| MeOH | 1.21 | 1.25 | 1.21 | 1.27 | 1.19 | 1.20 | 1.22 |
| EtOH | 1.33 | — | — | 1.40 | 1.33 | — | 1.37 |
| IPOH | 1.42 | 1.52 | 1.50 | 1.60 | 1.43 | — | 1.57 |
| Acetone | 1.63 | 1.58 | 1.57 | 1.60 | 1.48 | 1.55 | 1.55 |
| MeIBK | 1.62 | 1.64 | 1.63 | 1.66 | 1.53 | 1.59 | 1.61 |

Obviously, numerous modifications and variations of the present invention are possible in light of the above teachings. It is therefore understood that within the scope of the appended claims, the invention may be practiced otherwise than as specifically described herein.

What is claimed is:

1. An optical fiber splicer which comprises: a unistructural mass of inherent shape memory polymer material having a longitudinal dimension with opposite ends which includes a first bore at one end of said opposite ends into the inside of said mass, and a second bore at the other end of said opposite ends into the inside of said mass to and in alignment with said first bore, said mass having a first shape and a second shape:
  (a) said first shape being a unique, recoverable, predetermined inherent shape wherein said first bore and said second bore each have a preset diameter to accommodate and tightly hold end segments of denuded optical fibers of predetermined diameter in spliced, butted alignment with one another; and,
  (b) said second shape being a deformed shape caused by solvent swelling of said inherent memory polymer material wherein said first bore and said second bore each have a swollen predetermined diameter greater than the diameter of the aforesaid end segments of denuded optical fibers so as to loosely and freely receive said end segments of said denuded optical fibers;

said mass of inherent shape memory polymer material having been initially formed in said first shape (inherent shape) and having been swollen then partially shrunk to said second shape (deformed shape), and capable of being returned to said first shape by application of a non-mechanical stimulus thereto.

2. The optical fiber splicer of claim 1 wherein said first bore and said second bore are of different size diameter in their inherent shape and said bores have central axes which form a single straight line.

3. The optical fiber splicer of claim 1 wherein said first bore and said second bore are of the same size diameter in their inherent shape and have central axes which form a single straight line.

4. The optical fiber splicer of claim 1 wherein the said unistructural mass is crosslinked amorphous organic polymer with a glass transition temperature higher than 25° C. but lower than 200° C.

5. The optical fiber splicer of claim 4 wherein said amorphous crosslinked polymer has a glass transition temperature between 50° C. and 150° C.

6. The optical fiber splicer of claim 4 wherein said amorphous crosslinked polymer consits of at least one monomer selected from derivatives of acrylic acid, methacrylic acid and styrene.

7. The optical fiber splicer of claim 6 wherein said derivative is ester of methacrylic acid and alcohol with one to ten carbon atoms.

8. The optical fiber splicer of claim 1 wherein said unistructural mass has a shape which is asymmetrical with respect to the bore axis.

9. The optical fiber splicer of claim 8 wherein no surface of the unistructural mass is perpendicular to the bore axis.

10. The optical fiber splicer of claim 9 wherein said unistructural mass is trapezoidal and the largest of its rectangular faces is about parallel to the bore axis.

11. A method of preparing an optical fiber splicer which comprises:
  (a) polymerizing a monomer mixture of inherent shape memory polymer so as to create a unistructural mass having a longitudinal dimension with opposite ends which includes a first bore at one end of said opposite ends into the inside of said mass, and a second bore at the other end of said opposite ends into the inside of said mass to and in alignment with said first bore, each of said bores having a predetermined cross-section equal to or less than the cross-section of selected denuded optical fibers;
  (b) swelling the inherent shape memory polymer to an enlarged size such that each of said bores has an enlarged cross-section which is greater than the cross-section of said selected denuded optical fibers;

(c) partially shrinking the swollen inherent shape memory polymer by solvent removal to a deformed shape such that each of said bores has a predetermined cross-section which is less than the fully swollen cross-section but nonetheless greater than the cross-section of said selected denuded optical fibers.

12. The method of claim 11 wherein said polymerizing is carried out to create said unistructural mass by being reacted about one or more selected, denuded optical fibers.

13. The method of claim 11 wherein said swelling is performed by soaking in one or more thermodynamically good solvents.

14. The method of claim 12 wherein said swelling is performed by soaking in one or more thermodynamically good solvents.

15. The method of claim 11 wherein, after said swelling, at least one mandrel is inserted into said bores which has a cross-section greater than the cross-section of said selected, denuded optical fiber and then said shrinking is performed while said mandrel is inserted, and further wherein said mandrel is removed after said shrinking.

16. The method of claim 12 wherein, after said swelling, at least one mandrel is inserted into said bores which has a cross-section greater than the cross-section of said selected, denuded optical fiber and then said shrinking is performed while said mandrel is inserted, and further wherein said mandrel is removed after said shrinking.

17. The method of claim 13 wherein, after said swelling, at least one mandrel is inserted into said bores which has a cross-section greater than the cross-section of said selected, denuded optical fiber and then said shrinking is performed while said mandrel is inserted, and further wherein said mandrel is removed after said shrinking.

18. The method of claim 11 wherein said monomer mixture is selected from derivatives of acrylic acid and methacrylic acids.

19. The method of claim 18 wherein said derivatives are esters of alcohols.

20. The method of claim of 19 wherein said alcohols have 1 to 10 carbon atoms.

21. The method of claim 20 wherein said monomer mixture includes methylmethacrylate and butylmethacrylate.

22. The product resulting from the method of claim 11.

23. The product resulting from the method of claim 12.

24. The product resulting from the method of claim 13.

25. The product resulting from the method of claim 14.

26. The product resulting from the method of claim 15.

27. The product resulting from the method of claim 16.

28. The product resulting from the method of claim 17.

29. The product resulting from the method of claim 18.

30. The product resulting from the method of claim 19.

31. The product resulting from the method of claim 20.

32. The product resulting from the method of claim 21.

33. A method of splicing optical fibers in a butt-to-butt fashion, which comprises:

(a) inserting end segments of denuded optical fibers to be spliced into an optical fiber splicer having a unistructural mass of inherent shape memory polymer material having a longtudinal dimension with opposite ends which includes a first bore at one end of said opposite ends into the inside of said mass, and a second bore at the other end of said opposite ends into the inside of said mass to and in alignment with said first bore, said mass having a first shape which is unique, recoverable, predetermined inherent shape wherein said first bore and said second bore each have a preset diameter to accommodate and tightly hold end segments of denuded optical fibers of predetermined diameter to accommodate and tightly hold end segments of denuded optical fibers of predetermined diameter in spliced, butted alignment with one another; and, said mass having a second shape which deformed shape caused by solvent swelling of said inherent memory polymer material wherein said first bore and said second bore each have a swollen predetermined diameter greater than the diameter of the aforesaid end segments of denuded optical fibers so as to loosely and freely receive said end segments of said denuded optical fibers;

said mass of inherent shape memory polymer material having been initially formed in said first shape (inherent shape) and having been swollen then partially shrunk to said second shape (deformed shape) prior to the insertion of said end to segments of said optical fibers; and, (b) after said insertion, applying a non-mechanical stimulus to said unistructural mass so as to return to it its inherent shape to align and hold the spliced end segments of said optical fibers.

34. The method of claim 33 wherein said optical fiber splicer bores are of the same diameter and have central axes which form a single straight line.

35. The method of claim 33 wherein said non-mechanical stimulus is heat.

36. The method of claim 34 wherein said non-mechanical stimulus is heat.

* * * * *